April 1, 1969     K. L. JOHNSON     3,435,871
WELD ELEMENT
Filed July 12, 1967     Sheet 1 of 3
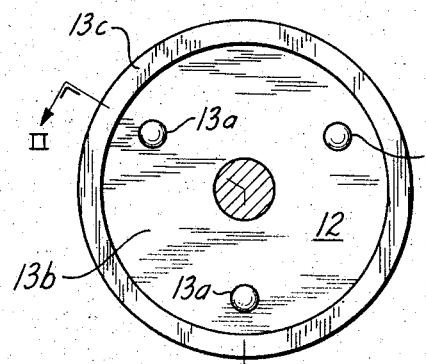
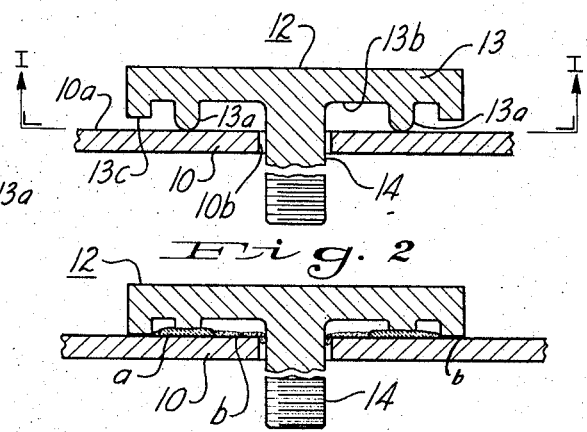
(PRIOR ART)
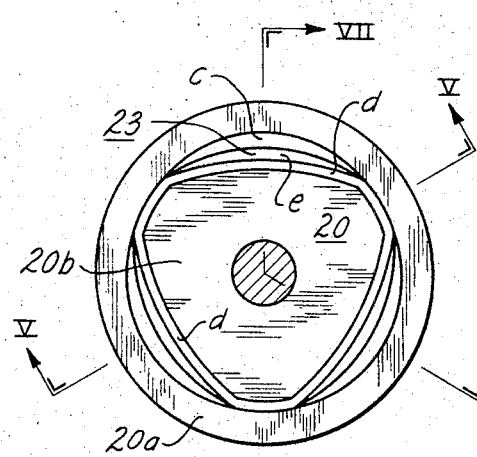
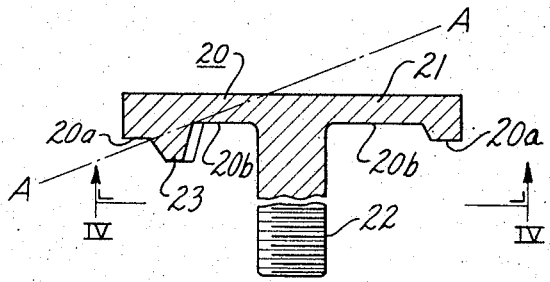
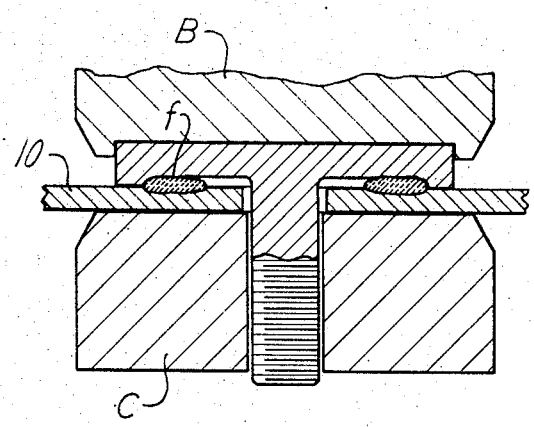
INVENTOR.
KENNETH L. JOHNSON
BY
Green McCallister and Miller
HIS ATTORNEYS

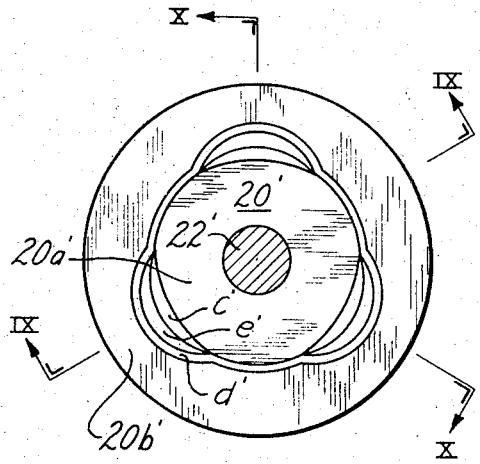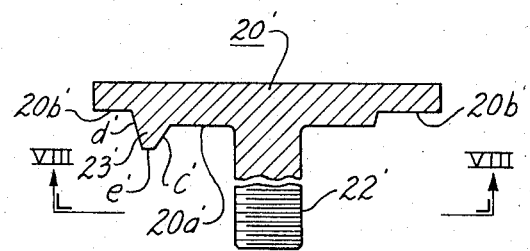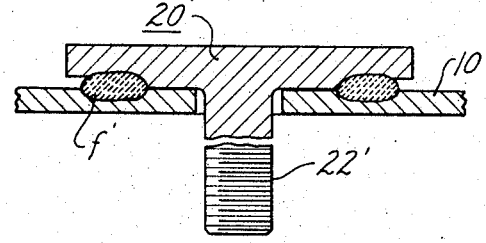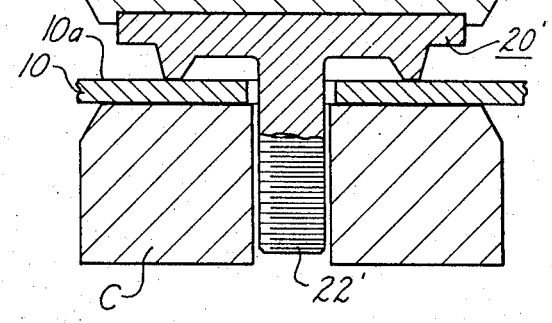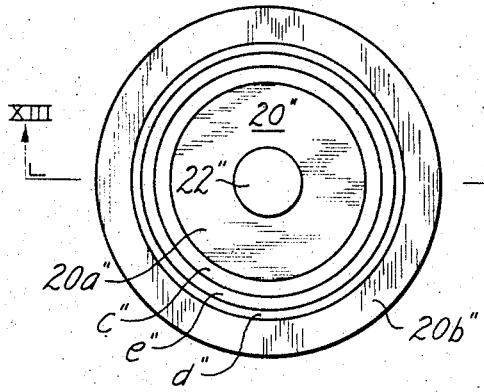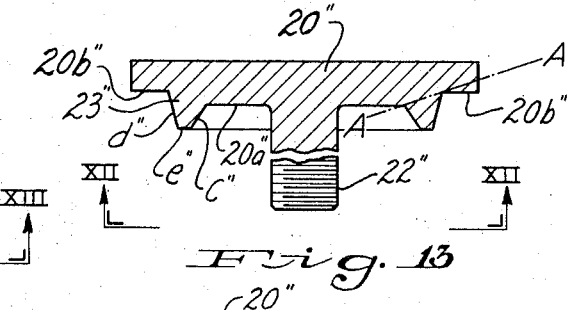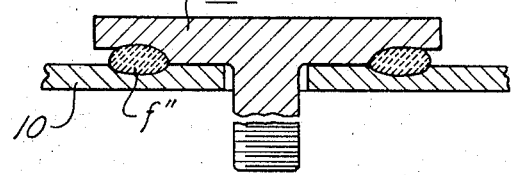

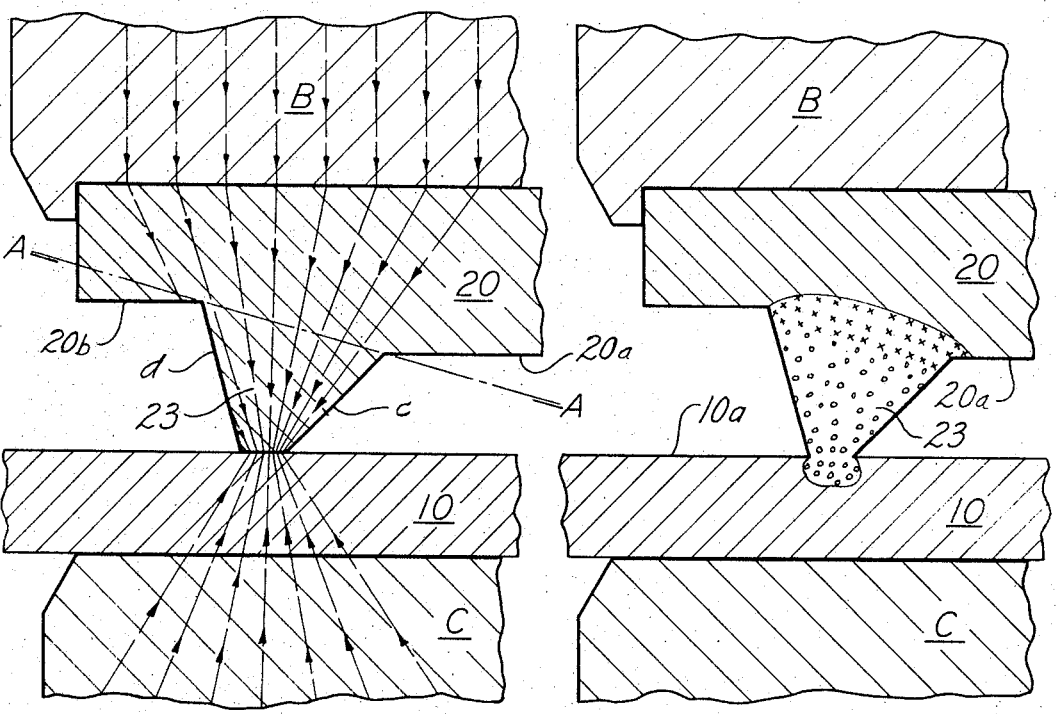
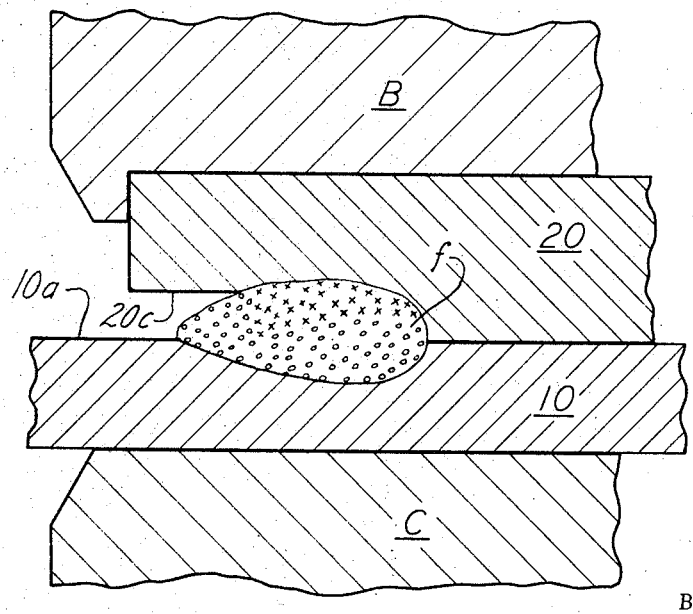

United States Patent Office 3,435,871
Patented Apr. 1, 1969

3,435,871
WELD ELEMENT
Kenneth L. Johnson, Pitcairn, Pa., assignor to Screw and Bolt Corporation of America, Pittsburgh, Pa., a corporation of Pennsylvania
Filed July 12, 1967, Ser. No. 652,770
Int. Cl. F16b *39/00;* B23k *9/02, 11/02*
U.S. Cl. 151—41.7               9 Claims

ABSTRACT OF THE DISCLOSURE

A weld element having a configurated under surface is provided with a weld projection area which has one side flank that is an integral and immediately-contiguous part of a position limit area that is backwardly-offset with respect to or of lesser height than the weld projection area. The weld projection area is provided with an opposed side flank of greater slope to direct flow of fused or molten weld metal into a relief area that is backwardly-offset with respect to the projection area and the position limit area. The flanks provide a weld projection area whose base lies on a transverse plane that slopes with respect to the axis of and the under surface of the weld element and declines towards the relief area.

---

This invention relates to improved weld elements, such as weld nuts, bolts or screws, that are to be projection welded to a base metal member.

Bolts or screws commonly have weld projections emanating from an under surface of the head. These projections become locally heated to a fusing or welding temperature when a high density electric current is passed through them in an electrical circuit that includes the head-like body of the bolt and the metal base member to which it is to be applied. The electric current passes from welding heads or electrodes in the most direct or least resistance path to the weld projections, where the concentration of high amperage current causes the weld projections to become heated to a fusing or welding temperature. The welding process is aided and facilitated by the appliction of a suitable mechanical force or pressure on the assembly, as exerted by the welding heads, to press the welding projections tightly against the base member.

The mechanical force initially serves to bring the weld projections into intimate contact with the base member and one welding head into similar contact with the top face of the head of the bolt, as well as to maintain the bottom side of the base member in efficient electric contact with an opposed bottom electrode to provide an efficient electrical circuit for the flow and utilization of electric current energy.

Another important function of the mechanical force is to prevent a violent expulsion of small amounts of gases and fused metal during the continuance of the welding operation. Projection welding that has occurred under conditions of less than proper pressure is evidenced by the presence of voids or blow holes in the welded area.

Weld bolts heretofore used have either a continuous ringlike weld projection or a plurality of peripherally-spaced projections that are shaped as a portion of a sphere. There also may be an interrupted ring forming a plurality of elongated weld projections. In all cases, the weld projections extend directly from a planar under surface of the head and have a connecting base that lies on a plane parallel thereto.

It has been determined, using conventionally shaped and positioned weld projections of the type above indicated, that the molten metal of the weld projections is, in effect, sandwiched between the head of the bolt and the base member. As a result, when the head and the base member approach a closed relation during the welding operation, molten metal is squeezed outwardly from the initial contact area. The dissipation of heat incident to this situation adversely affects the accomplishment of a true weld nugget that is indicative of a good molecular weld (as distinguished from a mechanical weld) between the head and the base member.

Further, when using constructions such as above indicated, one projection may tend to heat more slowly than another, due to a local poor electrical conductance that may arise from a bad surface condtion of the base member. As a result, the head of the bolt does not set down evenly and its shank is not normal to the surface of the base member, leading to difficulty in assembling mating parts. It is quite common for weld bolts to be broken loose from the base member by mere jostling that occurs in their transportation to an assembly station. Any attempt to straighten up a "cocked" shank, in order that it may enter the hole in a mating part, tends to break the mechanical bond that often exists in place of a desired type of true weld.

The sensitivity to many variables that are inherent in a welding operation has heretofore made necessary very close control of current pressure and time. It has been determined that, to a great degree, this sensitivity stems directly from the dissipation of heat that is incident to the dispersal of molten metal from the original contact areas. Attempts have been made to overcome this problem, one being to provide an upstanding annular rim around the outer edge of the head that is somewhat less in height than the weld projections and that is spaced from them. The intent has been that the rim is to act as a "down" stop to prevent a complete closing on the molten projections at the time of the installation, and to assure that the head of the bolt remains parallel to the base member. Although this structure is an improvement over the conventional structures first discussed, it has been determined that it falls short of the overall objective, on the basis that the mechanical pressure necessary for forming a sound weld is shifted with an abrupt shock from the molten projections to the solid rim as soon as the rim bears down upon the base member. The resultant release of pressure while the electric current is still flowing through the set up, and while the metal of the projections is still molten, causes an expulsion of gases and metal approaching an explosive-like action, with an attendant poor weld. That is, when the weld projections are melted progressively down until the rim has an abutting stopping contact with the base member, the welds start to sputter and throw metal and, as previously indicated, the "down" force of the welding head is relieved from the welding projections by an inherent rigid stopping action of the rim.

It is highly disadvantageous to suddenly remove the welding pressure prior to the end of the completion of the welding operation, as this tends to give a mechanical weld with dispersion of molten metal and a rapid heat dissipation at the weld zones.

By evaluating and discovering various important factors involved in the welding operation and in view of the disadvantageous features of present constructions, a construction has been attained which complies fully with necessary factors and does so without offsetting disadvantageous features in such a manner as to provide a solution to the problem and new and improved results.

It has been an object of the invention to incorporate advantageous features of prior constructions, without their disadvantageous features, in attaining a new and improved weld joint between a base member and an application weld element, such as a weld nut, bolt or screw.

Another object of the invention has been to devise new and improved procedure for welding an under side of a weld body part or element, such as the head-like body of a nut or the head body of a bolt, to a metal base member, whereby an efficient and effective molecular bond will be attained therebetween and without cocking of the weld element with respect to the base member.

Another object of the invention has been to devise a weld element that will eliminate the adverse features of prior constructions and that will provide an effective weld joint with a base member.

A further object has been to develop a weld face for a head-like weld element that will enable the continuance of requisite mechanical pressure without premature or abrupt removal during a welding operation.

A further object has been to control the dispersion of molten metal from the contact region of weld projections.

A still further object has been to utilize a so-called limiting or locating area or position limit projection in a new and improved manner with weld and relief areas during a welding operation.

These and other objects of the invention will appear to those skilled in the art from the illustrated embodiment and the claims.

In the drawings, FIGURES 1 to 3 are illustrative of prior art constructions and welds that are produced thereby. FIGURE 1 is a bottom plan view and FIGURE 2 is a side section in elevation on the same scale of a bolt weld element. FIGURE 2 is taken along the line II—II of FIGURE 1. FIGURE 3 is on the same scale as FIGURES 1 and 2 and is a similar section in elevation illustrating the type of weld joint attained with a metal base member. These figures show the utilization of a conventional stop face with weld projections wherein the stop face has a segregated, separated or spaced relation with respect to the projections.

FIGURES 4 to 7, inclusive, illustrate one embodiment of the invention and welding procedure employed in connection therewith. FIGURE 4 is a bottom view of a weld element, bolt or screw of the invention; FIGURE 5 is a side section in elevation on the same scale as and of the weld element of FIGURE 4; FIGURE 6 is a vertical section showing the weld element of FIGURES 4 and 5 in an initial or starting position for welding to a base member; and FIGURE 7 is a view similar to and on the same scale as FIGURE 6, but showing the weld element in its final welded position on the base member. FIGURES 5 and 6 are taken along the line V—V and FIGURE 7 is taken along the line VII—VII of FIGURE 4.

FIGURES 8 to 11, inclusive, are illustrative of another embodiment of the invention and of welding steps involved in its utilization. FIGURE 8 is a bottom plan view and FIGURE 9 is a sectional view in elevation on the same scale as FIGURES 4 and 5, illustrating a weld element of this embodiment of the invention; FIGURE 10 is a vertical section on the scale of FIGURES 8 and 9, showing an initial or starting welding position of the weld element; and FIGURE 11 is a similar view on the same scale showing the competition of the welding operation. FIGURE 9 is taken along the line IX—IX and FIGURES 10 and 11 are taken along the line X—X of FIGURE 8.

FIGURES 12, 13 and 14 are illustrative of a further embodiment of the invention. FIGURE 12 is a bottom plan view; FIGURE 13 is a side section in elevation of this embodiment, on the same scale as FIGURES 4 and 8; and FIGURE 14 is a vertical section on the same scale as FIGURES 12 and 13 showing a completed welding assembly of the same embodiment. FIGURES 13 and 14 are taken along the lines XIII—XIII of FIGURE 12.

FIGURES 15 to 17, inclusive, are somewhat diagrammatic vertical sections on a same enlarged scale, illustrating principles of the invention. FIGURE 15 illustrates electrical current density and flow between opposed electrodes through a weld element and its associated base member, as accomplished at the beginning of a welding operation. FIGURE 16 is illustrative of heat zones during the start of the welding operation, and FIGURE 17 is illustrative of heat zones during the completion of the welding operation.

The metal weld element of the invention has a configurated under surface or side on its head-like body that is provided with a weld projection area that is cooperatively utilized with a projecting position limiting area and with a relief area that is backwardly offset with respect to the weld projection and the position limiting area. The weld projection area is provided, radially or transversely of the under surface, with opposed side flanks of different slope to direct the flow of fused or molten weld metal or accomplish a preferential direction of flow during the welding operation, away from the position limiting projection area and towards and into the relief area. The welding operation is accomplished by positioning the under side of the weld element on an opposed face of a metal base member and applying a substantially constant inward force from top and bottom electrodes to the weld element and the base member, while applying electrical current to the eletrodes and progressively relatively advancing the weld element towards the opposed face of the base member as the weld projection area is progressively fused-down from its outer reaches towards its wide base portion.

The invention is shown applied to embodiments in which the position limiting area is located radially-outwardly as well as radially-inwardly of the associated weld projection area, but always with the flank side of greater slope or more abrupt angularity of the weld projection area located remotely of or opposite to the position limiting portion area and along the relief area. Also, as shown, the weld projection area may constitute a group of spaced-apart weld projections or an annular weld projection that extends with the position limiting area along the entire circumferential extent of the under side of the weld element for effecting a sealing-off type of joint where fluids are to be handled and leakage prevented.

In accordance with the invention, two important factors are met, namely, obtaining an effective molecular type of weld joint between a weld element head-like body and an opposed substantially flat or planar weld face of a metal base member, and secondly, avoiding an abrupt stop and release of pressure on a weld projection area or portions near the end of the welding operation. Supplemental thereto, the flow of fluid or fused weld projection metal is controlled and directionalized, the weld element body is brought into maximized proximity with the base member at the end of the welding operation, the welding pressure is desirably maintained substantially constant throughout the operation, a resilient or yieldable flow-give of metal that is adjacent to and integral with the locating or limiting face area is accomplished near the end of the welding operation, and cocking of the weld element or bolt is avoided.

The above factors and supplemental features are attained by making use of a "down" limit area in the nature of a locating projection or area which is made a supplemental, contiguous, integral part of the metal mass of the weld projections, such that electric welding current passes through a base zone of the weld projection area that has greater section than that of fused portions thereof during the operation and the metal of such base zone is electrically and conductively heated to a forgeable or plastic temperature before the welding electrode or head progressively advances and fuses the weld projection area "down" to a position at which contact is made between the opposed weld surface or face of the base member and control metal of the locating or position limiting area or projection. The welding operation is accomplished in such a manner that the under face of the body of the weld element having the weld projection thereon progressively relatively advances towards the opposed face of the base member and, as the weld projection is progressively electrically fused from its outer reaches or tip end, the under face of the weld element approaches a final position with respect to the opposed weld face of the base member, at which the control, locating or limiting area metal is to engage the weld face of the base member. At this time, a back-up, base zone or area of metal of the weld projection that is at a relatively lower forgeable temperature cushions or yieldably resists further inward movement of the weld element, but permits additional final closing movement thereof while maintaining a yielding pressure on the welding area. The shank of a bolt-like weld element is accurately maintained in a fully aligned position with a shank-receiving hole through the base member and until the operation is completed. An abrupt stopping of the "down" movement, spatter of the fused weld metal of the weld projections, and attendant vent or blow holes are avoided and a full molecular bond is attained in that a weld metal nugget is formed between the fused weld projection area and fused metal of the base member.

Also, in accordance with the invention, the direction of flow of fused weld metal and a deformation of forgeable metal is controlled so as to substantially contain its movement in one radial or transverse direction and to direct it in an opposite radial or transverse direction, by the employment of a more abrupt or greater angle of slope along one side flank of the weld projection metal in the direction of desired flow than along an opposite side flank in the direction of undesired flow.

Thus, in accordance with the invention, a sudden or abrupt stop release of welding pressure is avoided while, at the same time, a resilient or cushioning plastic flow of control or base area metal of the weld projection area is attained to maintain a yielding pressure, such that there is a somewhat gradual transition of pressure applied fully to the fused weld metal of the weld projection area to the limiting metal of the positive limit projection area. A desired, substantially constant force application is maintained to the end of the welding operation, such that a cocking of the weld element and splatter, etc., of the weld metal is avoided. The use of an abrupt slope angle along the side flank of the weld projection metal that is contiguous with a relief area, prevents such metal from flowing on the stop limit area or between it and the base metal member or to and about the shank and its threading.

FIGURES 1 to 3, inclusive, are representative of a prior type of weld element bolt or screw construction which is provided with a positive "down" stop area or projection that is isolated or spaced from the weld projections and not inherently a directly integral or supplemental part thereof, and is thus isolated from the standpoint of heating current and conductive heat flow from the weld projections. FIGURES 1 and 2 are illustrative of the design of the weld element and FIGURE 3 is illustrative of a type of weld that is attained utilizing such a design. There is no assurance of a molecular bond with the base member. The metal of the weld projections flows freely into the spacing between the base member and the under surface of the head, and the "down" limit metal projection area acts as an abrupt positive limit stop against further closing-in of the head with respect to the base member.

FIGURES 4 and 5, 8 and 9 and 12 and 13 illustrate three embodiments of a weld element bolt or screw embodying the principles of the invention. In all figures, the weld projections and the "down" locating projection or metal areas are in an immediately integral adjoining or contiguous relation with each other, such that they form contiguous metal masses through which the welding current flows and which is resistance heated thereby.

The weld projections of all embodiments are illustrated as having a steep slope on the flank-side that is to accommodate or facilitate flow of weld metal from the weld projections, and a lesser slope of the flank side to which the flow of weld metal of the weld projections is to be limited or inhibited. In the embodiment of FIGURES 4 and 5, it will be noted that the weld metal is to flow or to be relieved radially-inwardly towards the shank, and in the embodiments of FIGURES 8, 9 and 12, 13 it is to be relieved of flowing radially-outwardly. The embodiments of FIGURES 4 and 5 show the "down" position-limiting area as located radially-outwardly of the weld projection metal and the other two embodiments show such area as located centrally of the head of the weld element.

The embodiment of FIGURES 12 and 13 employs an annular or continuous type of weld projection and is particularly suitable for attaining a sealed-off type of joint to prevent leakage of a fluid, such as water, oil or gas under pressure. Although the limit area is shown as centrally located in FIGURES 12 and 13, it will be apparent that it may be peripherally located, as illustrated in the embodiment of FIGURES 4 and 5.

It will be noted from FIGURES 7, 11 and 14, that in all of these embodiments, as distinguished from the prior art joint illustrated in FIGURE 3, the final or completed product does not have spattered weld metal extruding at outer edges of the head of the weld element or bolt, into the hole of the metal base member, or upon the shank of the weld element. The weld bolt or element is maintained fully normal to the base member and the opening therethrough, and the heavier or thicker section base metal portion of each weld projection that is immediately adjacent to and integral with the "down" position limiting area of the inventive structure, itself, yields, moves, gives or acts in a controlling manner under "down" pressure, when the under face of the down, positive limiting or stop area of the weld element approaches close adjacency to the opposed weld face of the base member. That is, the forgeable or plastic base portions of the weld projections yieldably maintain a proper force on the fused tip metal; and fused metal is in a molecularly joined relationship between the weld projection area and an immediate area of the base member. As distinguished from FIGURE 3, there is no sudden and premature stopping of the requisite welding force movement, but a somewhat gradual, yieldable, somewhat resilient, controlled "give" towards the end of the operation, such that an improved bonding relation is obtained with reference to the fused metal. The "give" of the forgeable or plastic metal of the base portions of the weld projections also permits the opposed spaced surfaces or faces to reach maximum proximity. It will be noted that the heavier sectioned areas of the weld projections that are contiguous with the positive limit areas of the weld element are also electrically heated but to a forgeable temperature; due to their greater mass of metal and less resistance to current flow, do not reach the high fusing or fluid temperature of the tip portions of the weld projections. They can thus be utilized as resilient, giveable, force maintaining areas, without the disadvantageous features which have heretofore been encountered in using remote positive stop areas in combination with weld projections.

As previously indicated, the relative slopes of opposite flanks of the weld projections are utilized to direct flow accommodation of the fused or fluid metal during the operation. By way of example, the flank on the side in which flow is desired may have a slope angle of about 60°, 45° or 40°, as compared to a slope angle of about 30°, 22½° or 20° for the other or flow restriction side, with optimum results obtained where the flank angle of one side is about half that of the other side. Also, by way of example, the weld metal during the operation may have a temperature of about 2900° to 3000° F., and the forgeable control metal may have a temperature of about 2200° to 2400° F., while the pressure force, depending on the size of the bolt element, may be maintained substantially constant at a pressure within a range of about 400 through 700 and up to about 4000 pounds.

FIGURE 15 somewhat diagrammatically shows the flow of electric current which resistance heats the weld projections and the limit metal of the weld element or bolt. In this connection, it will be apparent that the embodiment of FIGURES 4 and 5 provides for a decreased current density at the base portions of the weld projections due to the change in cross-sectional area and the influence of the integral mass of the stop or limit area metal that lies contiguously, centrally-inwardly of the weld projections. The same is true of the embodiment of FIGURES 8 and 9 except that the stop area lies integrally and contiguously outwardly of the weld projections. In the embodiment of FIGURES 12 and 13, the influence of the integrally adjacent stop portion is the same. Although the stop or limit area lies inwardly of the weld projections, it may also be placed outwardly to produce comparable results. In FIGURES 16 and 17, the graduation of heating temperature is illustrated, in the sense that the circled portions indicate fused or molten temperature heated portions, and the $x$ portions indicate adjacent portions that are heated up to a forging temperature.

In the drawings, a work piece or base metal member 10 has a substantially planar or flat upper surface or face 10a to which a weld element is to be applied; it is shown provided with an opening or hole 10b therethrough for bypassing a threaded stud or shank of the weld element therethrough. Also in the drawings, the work piece 10 is shown supported on a lower welding head C and the weld element as carried or positioned by an upper weld head B. Similar parts in the embodiments of the invention represented respectively by FIGURES 4, 5, 6 and 7, by FIGURES 8, 9, 10 and 11 and by FIGURES 12, 13 and 14 have been given similar reference numerals but with prime and double prime suffixes.

Referring particularly to the prior art construction illustrated in FIGURES 1 to 3, inclusive, weld element 12 is shown in the form of a weld bolt having a head 13 and a threaded stud 14 and as provided with a group of pin-like and circumferentially spaced-apart weld projections 13a. These projections are carried by or positioned to extend from a planar main central under face portion 13b of the element 12 and in a spaced relation thereon with respect to an outer annular peripheral stop rim or flange portion 13c. When, as shown in FIGURE 3, the welding operation has been accomplished, weld metal $a$ consisting principally of metal melted from the projections 13a has, what may be termed, a substantial surface or mechanical bond with the work piece 10. The weld metal represented by $b$, in the form of thin splatter, tends to extend from the main portion $a$ along the spacing between the under side of the weld element 12 and the opposed upper face or side 10a of the work piece 10, and to extend into the hole 10b and towards the threaded portion of the stem 14. This type of weld is representative of results obtained with prior art construction using a so-called stop rim.

As contrasted to the results produced employing a construction such as shown in FIGURES 1 to 3, inclusive, the embodiments of FIGURES 4 to 7, inclusive, of the present invention produce a weld nugget that is, in effect, an alloy of the metal of weld element 20 and metal of the work or base metal piece 10, projecting into the latter and providing an effective molecular bond. Further, spatter weld metal, such as represented by $b$ of FIGURE 3 is eliminated.

Weld element 20 is also shown provided with a threaded shank 22 and a head portion 21; however, as distinguished from the prior art, its weld projections 23 are of an entirely different construction and are employed in an entirely different manner with a stop or positive limit area 20a, as provided by an annular or peripheral flange or rim that is integral and immediately contiguous with one side flank $c$ of the base portions of the weld projections 23 and with a backwardly-offset relief area 20b. As illustrated in FIGURE 4, three equally spaced weld projections 23 are of somewhat wiener or elliptical shape, lie along a common circle, and have flat apex or top surfaces $e$. The relief area 20b on the under side of surface of the weld element 20 is of at least slightly greater capacity than the anticipated quantity of metal flow from the weld projections 23. Each weld projection 23 is immediately contiguous along its opposite side flank $d$ with and is an integral part of the relief area 20b; the flank $d$ has a relatively abrupt or substantially greater slope than the side flank $c$ which is connected with the positive limit area 20a. As a result, excess molten weld metal provided during the welding operation will direct its flow towards the side $d$ of steeper down-sloped flank into the relief area 20b. In this manner, the positive limit area or portion 20a is protected from metal flow and will thus accurately maintain the weld element 20 in alignment with the work piece or base metal member 10 during the completion of the welding operation. During the welding operation, the tip or end portion of each weld projection 23 becomes molten and is progressively melted down and forms a true alloying weld nugget $f$ with a work piece 10.

In the embodiment of FIGURES 8 to 10, inclusive, welding element 20' has its relief area or face portion 20b' located along its outer periphery and its stop or positive limit area or portion 20a' located between weld propections 23' and shank 22'. Also, the steep or abrupt flank side $d'$ of each weld element 23' is integral and immediately contiguous with and connects with the area 20b' to thus direct the flow of weld metal into the relief pocket provided between such area and the upper surface or face 10a of the base metal piece 10. It will be noted that the same principle is involved in this embodiment as in the previously discussed embodiment, except that the relief and limit areas are reversed.

In the weld element 20" of the embodiment of FIGURES 12 and 13, weld projection 23" is of an annular or continuous shape, and relief area 20b" and positive limit area 20a" have the same positioning as in the embodiment of FIGURES 8 to 10. Side flank $d"$ is of greater slope and depth and side flank $c"$ is of lesser or gradual slope and of lesser depth.

Referring particularly to FIGURES 5, 13 and 15 of the drawings, an important feature of the invention is that the greatest mass or cross-sectional thickness of the weld projection area or, in other words, its base, does not, as heretofore customary, lie along a horizontal plane at right angles to the axis of the weld element but, on the other hand, lies along a plane represented by line A—A that is inclined with respect to the horizontal or transverse plane of the weld element and its under side surface, and that declines as shown towards or into the relief area. In addition, the base portion of the weld projection or area 23, 23' or 23" is integral and immediately contiguous on one side with the projecting positive limit area, portion or surface 20a, 20a' or 20a" to provide a maximized bottom area that attains a forgeable heat and becomes yieldable during the welding operation. The inclined base portion thus provides a giveable or yieldable, somewhat resilient, termination of the welding operation, as the limit area 20a, 20a' or 20a" approaches an abutting relation with the opposed surface 10a of the work piece.

In FIGURES 16 and 17, as previously indicated, the main fused metal portions of a weld projection are represented by small circles and the forgeable portions of the weld projections are represented by small $x$'s. The flow of electrical current is represented by the arrows of FIGURE 15. In accordance with the invention, the stop or limit area, portion or rim of the weld element, never becomes hot enough to be forgeable but importantly, the base portion of the welding area or projection does become forgeable. This is due to the fact that the base of each weld projection is immediately contiguous with and integral with the metal mass of the positive limit area and has its much greater effective cross-sectional area along an inclined plane, as compared to the transverse or horizontal plane of the tip portion of the projection and of the positive limit projection. The influence of the metal mass that comprises the positive limit portion tends to conduct heat from the adjacent base portion that lies closest depthwise to the weld tip to prevent such portion from coming up to a welding temperature. The increased section or mass of the base of the weld projection provides a lesser resistance to current flow, but the greater depth extent of the weld projection along the portion of its base adjacent the relief area, provides it with a slightly greater resistance to flow such that its forgeable temperature is slightly greater to facilitate "give" of the base metal towards such relief area. The base portion of forgeable temperature of each weld projection extends slightly above the surrounding surface of the stop area during the last stage of the welding operation, and yields backwardly to allow the stop area to come into a cushioned abutment with the surface of the work piece. Thus, an important characteristic of the inventive structure is that the plane of greatest base section A—A, slopes or declines in all embodiments from the stop area across the base of the weld projection area towards the relief area.

In the embodiments employing spaced-apart welding projections, it will be noted that the positive limit area extends between such spacing and is therebetween integrally and immediately connected by a sloped side flank with the relief area (see FIGURES 5 and 9). The weld element in all embodiments is shown provided with a planar upper surface for receiving the welding head B and with a configurated under surface constructed to employ the principles of the invention.

What I claim is:

1. A metal weld element that has a head-like body provided with an upper welding force application surface and a configurated under surface to be weld-secured by fusion on an opposed substantially flat face of a metal base member which comprises, at least one weld projection on the under surface of the body and having opposed side flanks sloping to diverge towards the body, at least one position limit projection on the under surface of the body integral and immediately contiguous with one side flank of and backwardly-offset with respect to said weld projection, a relief area on the under surface in a backwardly-offset relation with respect to said position limit projection and integral and immediately contiguous with the opposite side flank of said weld projection, the base of said weld projection being on a plane that is inclined with respect to the under surface of the body and that declines towards said relief area, and the opposite side flank having an angle of slope with respect to said relief area that is substantially greater than the angle of slope of said one side flank with respect to said position limit projection, whereby weld metal will flow during a welding operation towards said relief area and away from said position limit projection.

2. A metal weld element as defined in claim 1 wherein, said one side flank is an outer flank of and said opposite side flank is an inner flank of said weld projection, and said position limit projection is on an outer peripheral portion of and said relief area is on an inner central portion of the under surface of the body.

3. A metal weld element as defined in claim 1 wherein, said one side flank is an inner flank of and said opposite side flank is on an outer flank of said weld projection, and said position limit projection is on the inner central portion of and said relief area is on an outer peripheral portion of the under surface of the body.

4. A metal weld element as defined in claim 1 wherein said opposite side flank has an angle of slope that is about twice the angle of slope of said one side flank.

5. A metal weld element as defined in claim 1 wherein, said weld projection and said position limit projection are both of annular shape.

6. A metal weld element as defined in claim 1 wherein, a group of weld projections of the defined construction are positioned in a peripherally spaced-apart relation on the under surface of the body, said position limit projection is of annular shape and extends along in an integral and immediately contiguous relation with said one side flank of each weld projection of said group, and said relief area is of continuous extent and extends along in an integral and immediately contiguous relation with said opposite side flank of each weld projection of said group.

7. A metal weld element as defined in claim 7 wherein each of said weld projections is of substantially elliptical shape and lies on a common circle with the other weld projections of the group.

8. A metal element as defined in claim 6 wherein, said position limit projection is of annular shape to extend across the spacing between said weld projections, and said position limit projection slopes between said weld projections into said relief area.

9. A metal element as defined in claim 6 that is in the nature of a weld bolt that has a shank extending centrally from the under surface of the body to project through a hole in the base member.

References Cited

UNITED STATES PATENTS

| | | | |
|---|---|---|---|
| 2,167,285 | 7/1939 | Smith | 151—41.7 |
| 2,245,298 | 6/1941 | Proctor | 219—107 |
| 2,784,758 | 3/1957 | Rohe | 151—41.7 |
| 2,931,888 | 4/1960 | Thome | 219—107 |
| 2,936,806 | 5/1960 | Harper | 151—41.7 |
| 3,140,738 | 7/1964 | Johnson | 151—41.7 |
| 3,184,576 | 5/1965 | Bazill et al. | 29—484 |
| 3,279,517 | 10/1966 | Logan | 151—41.7 |

FOREIGN PATENTS

| | | |
|---|---|---|
| 248,509 | 12/1963 | Australia. |
| 111,351 | 8/1964 | Czechoslovakia. |
| 720,402 | 12/1954 | Great Britain. |
| 737,502 | 9/1955 | Great Britain. |
| 851,321 | 8/1958 | Great Britain. |

MARION PARSONS, JR., *Primary Examiner.*

U.S. Cl. X.R.

219—107

UNITED STATES PATENT OFFICE
CERTIFICATE OF CORRECTION

Patent No. 3,435,871                          April 1, 1969

Kenneth L. Johnson

It is certified that error appears in the above identified patent and that said Letters Patent are hereby corrected as shown below:

Column 2, line 13, "conductance" should read -- condition --. Column 3, line 42, after "bottom" insert -- plan --. Column 7, line 62, "construction" should read -- constructions --. Column 8, line 10, "of", first occurrence, should read -- or --. Column 9, line 39, "employ" should read -- embody --. Column 10, line 28, the claim reference numeral "7" should read -- 6 --.

Signed and sealed this 7th day of April 1970.

(SEAL)
Attest:

Edward M. Fletcher, Jr.                         WILLIAM E. SCHUYLER, JR.
Attesting Officer                                 Commissioner of Patents